US011080600B2

(12) United States Patent
Mosayyebpour et al.

(10) Patent No.: US 11,080,600 B2
(45) Date of Patent: *Aug. 3, 2021

(54) RECURRENT NEURAL NETWORK BASED ACOUSTIC EVENT CLASSIFICATION USING COMPLEMENT RULE

(71) Applicant: SYNAPTICS INCORPORATED, San Jose, CA (US)

(72) Inventors: Saeed Mosayyebpour, Irvine, CA (US); Trausti Thormundsson, Irvine, CA (US)

(73) Assignee: SYNAPTICS INCORPORATED, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/724,025

(22) Filed: Dec. 20, 2019

(65) Prior Publication Data

US 2020/0125952 A1    Apr. 23, 2020

Related U.S. Application Data

(63) Continuation-in-part of application No. 15/894,883, filed on Feb. 12, 2018, now Pat. No. 10,762,891.

(60) Provisional application No. 62/457,663, filed on Feb. 10, 2017, provisional application No. 62/465,723, filed on Mar. 1, 2017.

(51) Int. Cl.
*G06N 3/08* (2006.01)
*G06N 3/04* (2006.01)

(52) U.S. Cl.
CPC .............. *G06N 3/08* (2013.01); *G06N 3/0445* (2013.01)

(58) Field of Classification Search
CPC ......... G10L 15/00; G06N 3/0445; G06N 3/08
USPC .......................................... 704/232; 714/748
See application file for complete search history.

(56) References Cited

U.S. PATENT DOCUMENTS

| 5,155,763 | A | * | 10/1992 | Bigus | G06N 3/105 |
| | | | | | 379/111 |
| 5,630,023 | A | * | 5/1997 | Oteki | G06F 7/68 |
| | | | | | 706/41 |
| 6,041,299 | A | * | 3/2000 | Schuster | G10L 15/16 |
| | | | | | 704/232 |
| 6,470,261 | B1 | * | 10/2002 | Ng | G06K 9/00785 |
| | | | | | 701/117 |

(Continued)

*Primary Examiner* — Michael Colucci
(74) *Attorney, Agent, or Firm* — Haynes and Boone, LLP

(57) ABSTRACT

An acoustic event detection and classification system includes a start-end point detector and multi-class acoustic event classification. A classification training system comprises a neural network configured to perform classification of input data, a training dataset including pre-segmented, labeled training samples, and a classification training module configured to train the neural network using the training dataset. The classification training module includes a forward pass processing module, and a backward pass processing module. The backward pass processing module is configured to determine whether a current frame is in a region of target (ROT), determine ROT information such as beginning and length of the ROT and update weights and biases using a cross-entropy cost function and a many-or-one detection (MOOD) cost function. The backward pass module further computes a soft target value using ROT information and computes a signal output error using the soft target value and network output value.

20 Claims, 6 Drawing Sheets

Backward pass

(56) References Cited

U.S. PATENT DOCUMENTS

| | | | | |
|---|---|---|---|---|
| 6,615,382 B1* | 9/2003 | Kang | H04L 1/0009 | 714/748 |
| 6,728,404 B1* | 4/2004 | Ono | G06K 9/3241 | 382/118 |
| 7,110,526 B1* | 9/2006 | Dezonno | H04M 3/5232 | 379/265.02 |
| 8,675,839 B1* | 3/2014 | Noble, Jr. | H04M 3/5232 | 379/112.08 |
| 9,191,304 B1* | 11/2015 | Plate | H04L 12/6418 | |
| 9,723,144 B1* | 8/2017 | Gao | H04M 3/5238 | |
| 10,013,640 B1 | 7/2018 | Angelova | G06K 9/00624 | |
| 10,114,554 B1* | 10/2018 | Gonzalez | G06F 3/0647 | |
| 2003/0115041 A1* | 6/2003 | Chen | G10L 19/002 | 704/200.1 |
| 2003/0225786 A1* | 12/2003 | Hall | G06Q 30/02 | |
| 2005/0216426 A1* | 9/2005 | Weston | G06K 9/6256 | 706/12 |
| 2005/0261898 A1* | 11/2005 | Van Klinken | H04L 25/03019 | 704/219 |
| 2010/0198054 A1* | 8/2010 | Ewing | A61B 5/055 | 600/420 |
| 2011/0224975 A1* | 9/2011 | Li | G10L 19/08 | 704/203 |
| 2015/0381809 A1* | 12/2015 | Fleming | H04M 3/5232 | 379/265.11 |
| 2016/0048766 A1* | 2/2016 | McMahon | G06N 20/20 | 706/12 |
| 2017/0005644 A1* | 1/2017 | Sayeh | G02F 1/00 | |
| 2017/0083829 A1* | 3/2017 | Kang | G06N 3/0454 | |
| 2017/0148431 A1* | 5/2017 | Catanzaro | G10L 15/063 | |
| 2017/0249551 A1* | 8/2017 | Iljazi | G06F 3/0623 | |
| 2017/0344829 A1* | 11/2017 | Lan | G06K 9/00369 | |
| 2017/0372197 A1* | 12/2017 | Baughman | A23L 33/30 | |
| 2018/0203848 A1* | 7/2018 | Perez | G10L 25/30 | |
| 2018/0233130 A1* | 8/2018 | Kaskari | G10L 15/16 | |
| 2018/0253648 A1* | 9/2018 | Kaskari | G06N 3/084 | |

* cited by examiner

Forward Pass

Backward pass

RECURRENT NEURAL NETWORK BASED ACOUSTIC EVENT CLASSIFICATION USING COMPLEMENT RULE

CROSS-REFERENCE TO RELATED APPLICATIONS

This application is a continuation-in-part of U.S. patent application Ser. No. 15/894,883, filed Feb. 12, 2018, titled "Binary and Multi-Class Classification Systems and Methods Using Connectionist Temporal Classification," which claims the benefit of and priority to both U.S. Provisional Patent Application No. 62/457,663 filed Feb. 10, 2017 and entitled "Connectionist Temporal Classification (CTC) Network Using Cross-Entropy Cost Function for Binary Classification" and U.S. Provisional Patent Application No. 62/465,723 filed Mar. 1, 2017 and entitled "Recurrent Network For Connectionist Temporal Classification (CTC) Using Segmented Labeled Sequence Data," all of which are incorporated herein by reference in their entirety.

TECHNICAL FIELD

The present application relates generally to information classification, and more particularly, for example, to acoustic event detection and classification systems and methods for use in speech recognition systems.

BACKGROUND

Recurrent neural networks are commonly used in information classification systems, such as binary classification applications for speech recognition, which may include keyword spotting or an event detection and multi-class classification speech recognition (e.g., phoneme recognition or event classification). Many conventional approaches are highly complex and result in implementations that are not practical for use in applications with memory, power and processing limitations, such as applications running on mobile phones and other low power devices. Efforts to reduce complexity often come at the cost of less flexibility, memory inefficiencies, and other undesirable performance measures. In view of the foregoing, there is a continued need in the art for solutions to optimize information classification systems that are fast, accurate and resource efficient.

SUMMARY

The present disclosure provides systems and methods that address a need in the art for improved acoustic event classification within a Region of Target (ROT). Here a ROT is defined as a region which contains the acoustic event such as door knocking sound. In various embodiments, an event classification solution is provided that is suitable for many low power, low memory implementations (including real time classification). The embodiments disclosed herein utilize a neural network such as Long Short-Term Memory (LSTM) to train a model to recognize an event in a continuous context. An improved cost function efficiently enforces the neural network to detect the event of interest with at least one spike sometime during the event duration. The cost function can be efficiently implemented within the computational and memory constraints of many systems. In some embodiments, the complement rule is used to efficiently compute the probability of recognizing an event during the event duration. The model is trained to spike when a confidence level is satisfied for detecting an event, rather than enforcing the model to spike all the times.

In one embodiment, a computer-implemented method for training a neural network for acoustic event classification includes receiving, at a computing device, a stream of training data including a plurality of input samples having segmented labeled data; computing, by the computing device, a network output for each input sample in a forward pass through the training data; and updating, by the computing device, weights and biases through a backward pass through the neural network, including determining whether an input frame is in a Region of Target (ROT), estimating the update of the weights and the biases of the neural network based on a cross-entropy cost function for non-ROT frames and a many-or-one detection (MOOD) cost function for ROT frames. The network is trained using the MOOD cost function to cause the neural network to spike at least one time during the acoustic event duration.

In one embodiment, a classification training system includes a neural network configured to classify audio input data; a training dataset providing segmented labeled audio training examples; and a classification training module configured to train the neural network using the segmented labeled training data, the classification training module comprising a forward pass processing module, and a backward pass processing module. The forward pass processing module is configured to train the neural network by generating neural network outputs for the training data using a current value of weights and biases for the neural network. The backward pass processing module is configured to train the neural network by updating the weights and biases by passing backward through generated neural network outputs, determining whether an input frame is in a Region of Target (ROT), applying a many-or-one detection (MOOD) cost function for ROT frames, and adaptively learning to improve a convergence rate of the neural network.

The scope of the disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Aspects of the disclosure and their advantages can be better understood with reference to the following drawings and the detailed description that follows. The included drawings are for illustrative purposes and serve only to provide examples of possible systems and methods for the disclosed methods and systems. These drawings in no way limit any changes in form and detail that may be made to that which is disclosed by one skilled in the art without departing from the spirit and scope of this disclosure.

DETAILED DESCRIPTION

Figure 1:
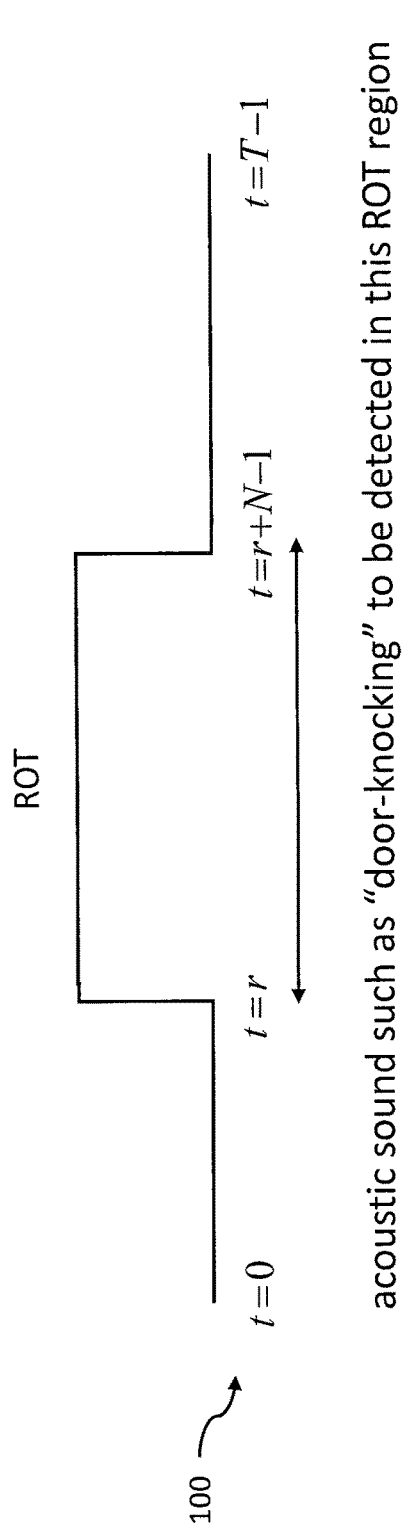
FIG. 1 illustrates example Region of Target (ROT) labeling with a sequence of input data, in accordance with one or more embodiments of the present disclosure.

In accordance with various embodiments of the present disclosure, systems and methods for acoustic event classification are disclosed. Some embodiments provide improved systems and methods for training a recurrent neural network for acoustic event detection The present disclosure provides improved acoustic event detection and classification systems and methods. Event detection and classification is a common functionality found in many perceptually aware interfaces working in collaborative human communication environments (e.g., meeting-rooms or classrooms). Human activity may be reflected in a variety of acoustic events produced by the human body or by objects handled and/or controlled by humans in the environment. Auditory scene analysis of such activity by a computer processing system may be used to detect and describe human activity as well as to increase the robustness of automatic speech recognition and active noise cancelation systems. Auditory scene analysis may also be useful for automatic tagging in audio indexing, automatic sound analysis for audio segmentation, audio context classification and other audio detection and classification tasks.

Researchers have attempted to use information extracted from various sounds to enrich various applications, such as monitoring systems for elderly people or infants, automatic surveillance systems, automatic lifelogging systems, and advanced multimedia retrieval systems, for example. The techniques used in these applications include acoustic scene analysis (ASA) that analyzes scenes in terms of the places, situations, and the user activities they depict, and acoustic event analysis (AEA) that analyzes various sounds, such as footsteps, the rumble of traffic, and screams.

Acoustic event classification (AEC) is often one of the features of a computational auditory scene analysis process. An audio context or scene may be characterized, for example, by the presence of individual sound events. Speech is often an informative acoustic event for analyzing human activity, but other types of sounds may also carry useful information including, for example, clapping or laughing inside a speech segment, a strong yawn in the middle of a lecture, coughing, sneezing, a chair moving or door noise when the meeting has just started, sounds of animals, objects, and nature, and/or other sounds associated with other situations/events.

In various embodiments disclosed herein, systems and methods for managing a multi-class description of audio or video (e.g., files or signals) by detecting the categories of sound events which occur are provided. For example, it may be desirable to tag a holiday recording as being on the "beach", playing with the "children" and the "dog", right before the "storm" arrived. Different levels of annotations may be defined and recognized or inferred from acoustic events. The "beach," for example, is a context that could be inferred from acoustic events like waves, wind, and water splashing. Audio events such as "dog barking" or "children" may be explicitly recognized from the acoustic event, because such acoustic event may also appear in other contexts.

In various embodiments, a real-time acoustic event classification solution is provided that is suitable for many low power, low memory implementations. The embodiments disclosed herein utilize a recurrent neural network such as Long Short-Term Memory (LSTM) to train a model to recognize an event in a continuous context. An improved cost function efficiently enforces the neural network to detect the event of interest with at least one spike sometime during the event duration. The cost function can be efficiently implemented in systems computational and memory constraints. In some embodiments, the complement rule is used to efficiently compute the probability of recognizing an event during the event duration. The model is trained to spike when a confidence level is satisfied for detecting an event, rather than enforcing the model to spike many times. This system may be used to classify acoustic events detected with the start-end detection system disclosed herein and/or in other event detection systems.

Acoustic Event Classification

In various embodiments, a real-time acoustic event classification solution is provided that is suitable for many low power, low memory implementations. The embodiments disclosed herein utilize a recurrent neural network such as Long Short-Term Memory (LSTM) to train a model to recognize an event in a continuous context. An improved cost function efficiently enforces the neural network to detect the event of interest with at least one spike sometime during the event duration. The cost function can be efficiently implemented in systems computational and memory constraints. In some embodiments, the complement rule is used to efficiently compute the probability of recognizing an event during the event duration. The model is trained to spike when a confidence level is satisfied for detecting an event, rather than enforcing the model to spike many times. The acoustic event classification systems and methods disclosed herein classify events in a Region of Target (ROT).

Figure 2:
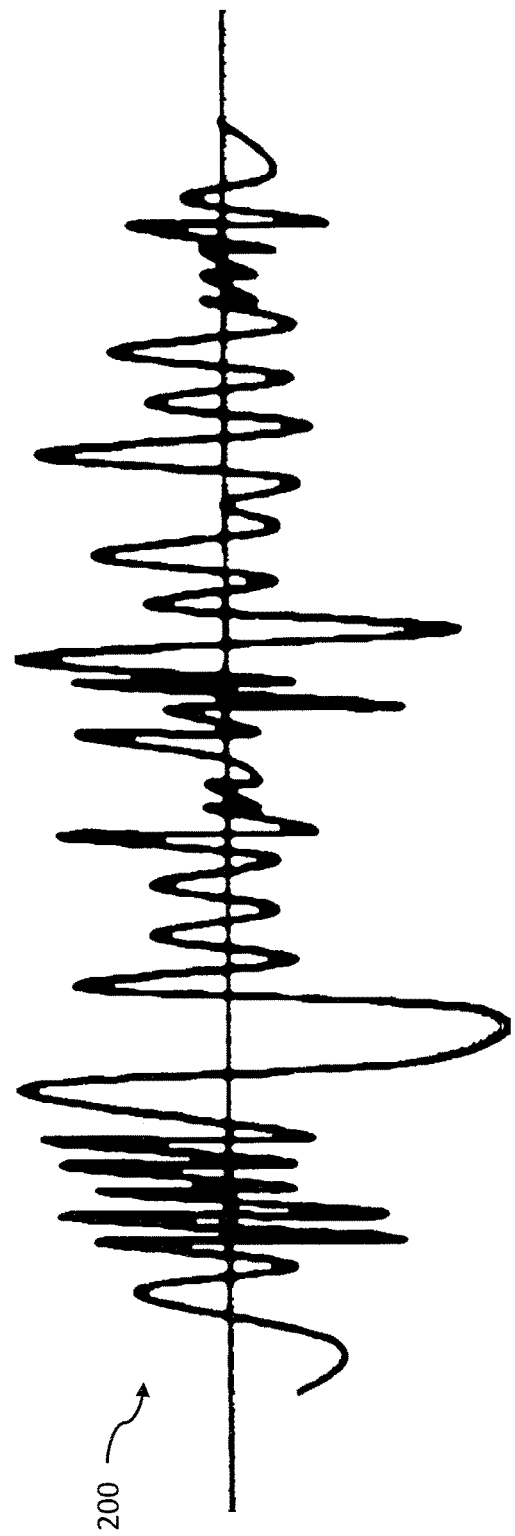
FIG. 2 illustrates an example waveform for an acoustic event, in accordance with one or more embodiments of the present disclosure.

Additional aspects of the ROT will now be described with reference to the examples in FIGS. 1 and 2. As illustrated, an acoustic event to be detected may include the presence of a "door-knocking" in an audio sequence. An audio input system generates an input audio stream detected from an environment (e.g., an audio waveform 200) which is provided as input to an audio processing system. The audio waveform is divided into a sequence of audio frames 100 (e.g., a sequence of frames t in order from frame 0 to frame T−1). A region of interest ROT is identified from frame t=r to frame t=r+N−1 to encompass the acoustic event. In some embodiments, the ROT can be defined in a bigger region to include the neighbor frames before and after. Labeled training data including audio waveforms with labeled ROTs may be used to train one or more neural networks disclosed herein. The label values in the illustrated example are one in the ROT and in the other frames (non-ROT) are zero. The systems and methods disclosed herein enable accurate ROT detection, which allows for increased processing efficiency and accuracy. The ROT labeling may include other audio event classifications such as labels to identify keywords, and corresponding start points and end points of ROTs. Other labeling may include audio contexts of interest such as clapping, laughing, coughing, animal sounds, sounds made by objects associated with the context and other audio events.

Figure 3:
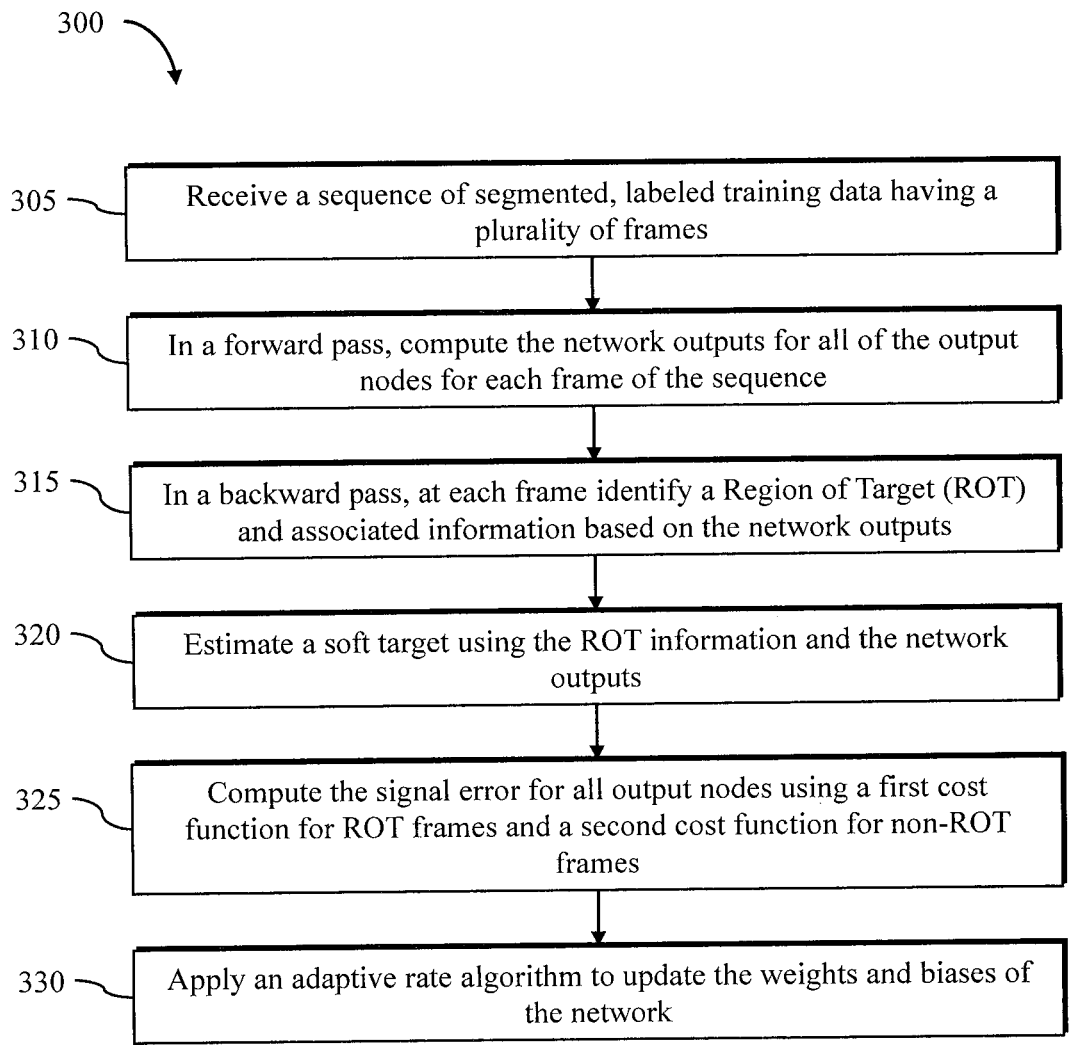
FIG. 3 is a flow diagram illustrating a process for training an acoustic event detection and classification system, in accordance with one or more embodiments of the present disclosure.
Figure 4:
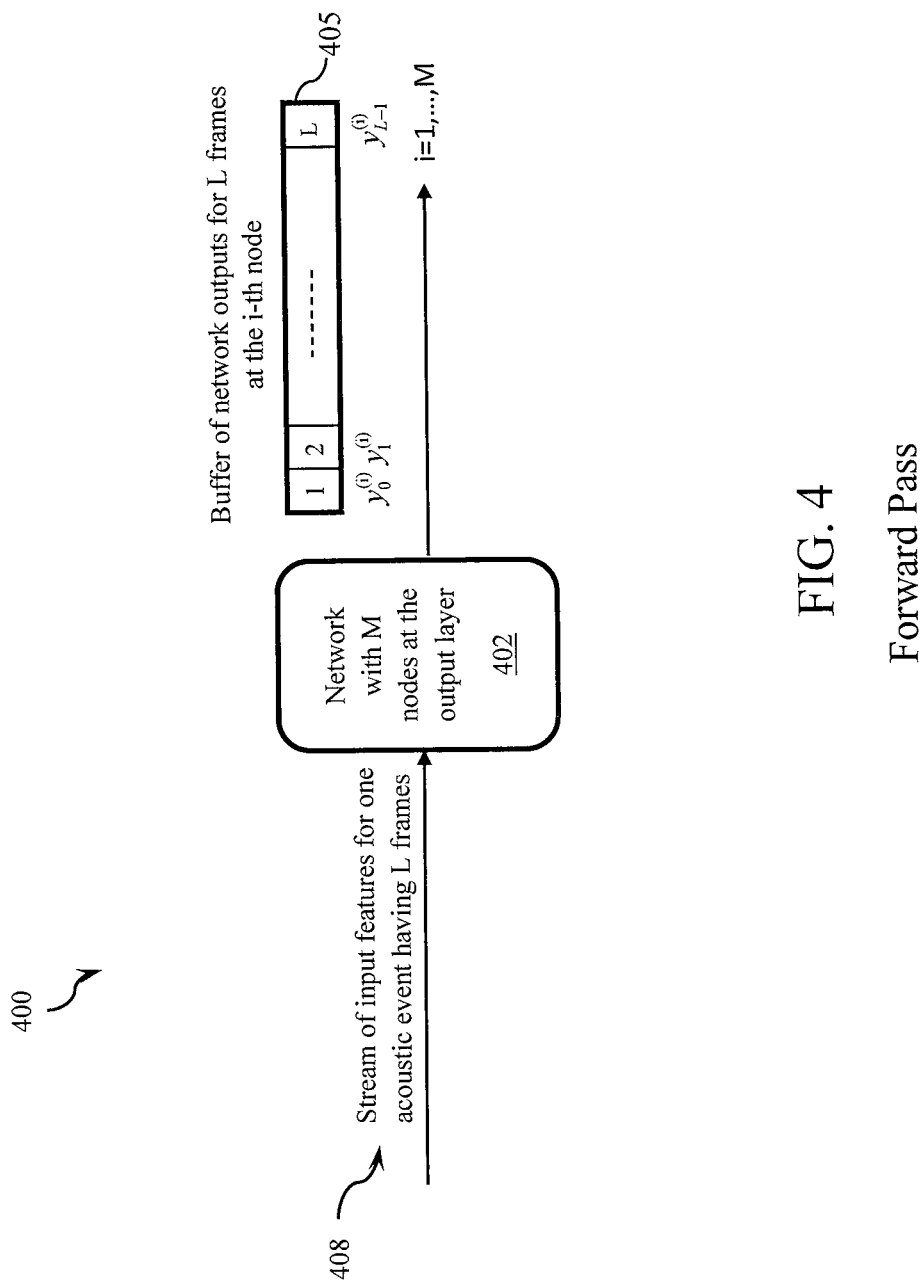
FIG. 4 is a block diagram illustrating an example detecting and classification training system, in accordance with one or more embodiments of the present disclosure.
Figure 5:
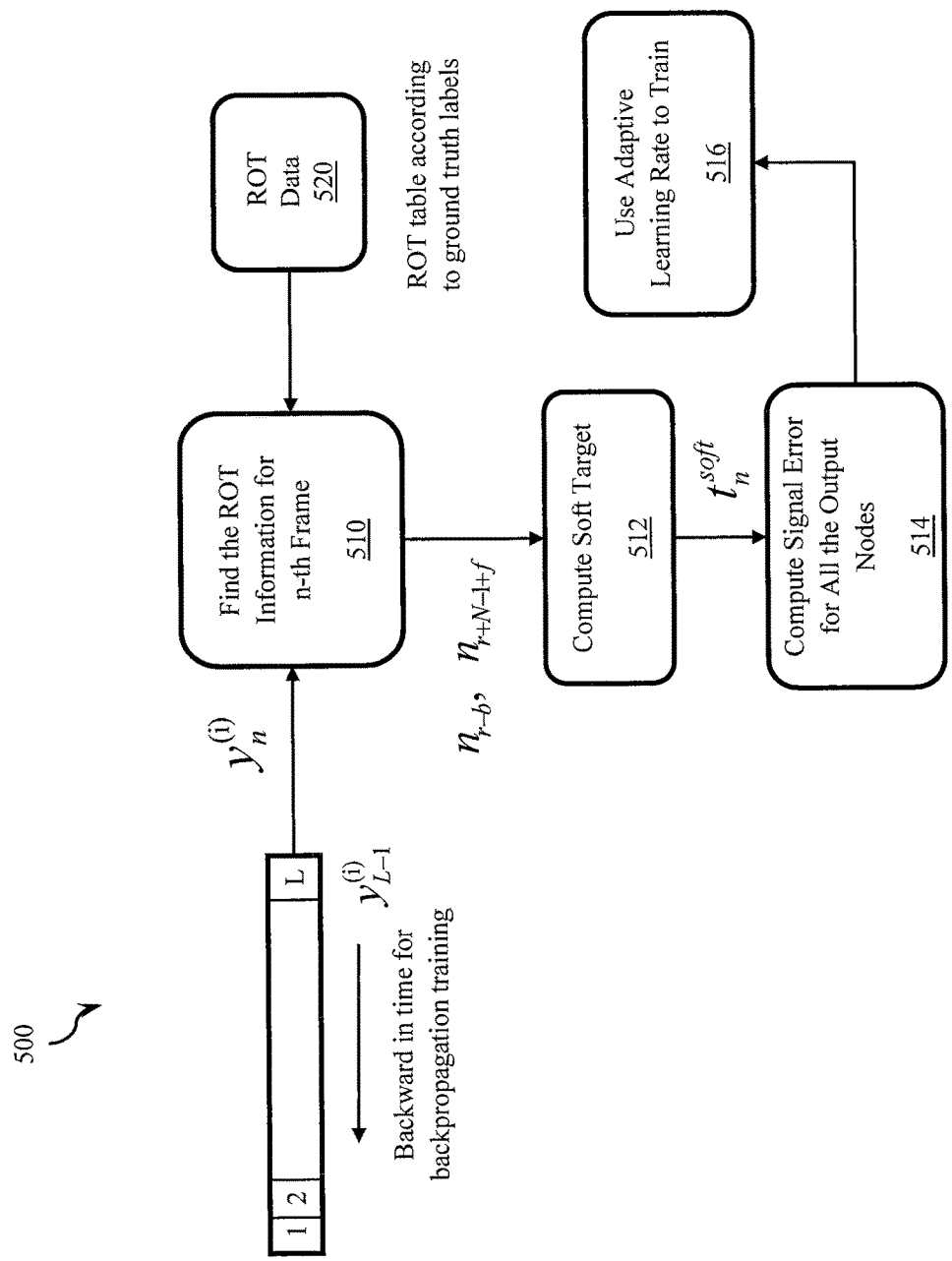
FIG. 5 is a block diagram illustrating an example detection and class classification system, in accordance with one or more embodiments of the present disclosure.

Referring to FIGS. 3-5, example embodiments of systems and methods for training a network 402 for a classification application, such as acoustic event classification, will now be described. The system may be trained in accordance with the procedure 300 of FIG. 3 as further described below. In step 305, the system receives a sequence of segmented, labeled training data having a plurality of frames. In step 310, a forward pass of the data through the network is conducted, including computing network outputs for all of the output nodes for each frame of the sequence. An example forward pass forward pass procedure 400 is illustrated in FIG. 4, in which the network outputs for all of the output nodes ($y_n^{(i)}$, i=1, ..., M), for each frame of a sequence of training data 408, are computed, where M is the number of classes of acoustic events. In the illustrated embodiment, the output layer of the network comprises a sigmoid layer and the number of output nodes of the network correspond to the number of classes. The network outputs for all the frames of the sequence are stored in a buffer 405.

Next, in step 315, a backward pass through the network is conducted, including identifying at each frame a region of target and associated information based on the network outputs. In step 320, a soft target is estimated using the ROT information and the network outputs. Next, a signal error for all output nodes is computed (step 325) using a first cost function for ROT frames and a second cost function for non-ROT frames. In step 330, an adaptive rate algorithm is applied to update the weights and biases of the network.

An example backward pass procedure 500 is illustrated in FIG. 5. The process starts from the last frame ($y_{L-1}^{(i)}$) and goes backward in time to compute the signal error for each frame at the input of the softmax node ($\delta_n^{(i)}$). This error is propagated backwards through the unfolded network, for example, by using a Back Propagation Through Time (BPTT) process, such as disclosed in A. Graves and J. Schmidhuber, "Framewise phoneme classification with bidirectional LSTM and other neural network architectures", Neural Networks, vol. 18, pp. 602-610, 2005, which is incorporated herein by reference in its entirety.

In various embodiments, the backward pass includes the following steps. In step 510, at each frame, the Region of Target (ROT) is determined. ROT data 520 (e.g., an ROT table) is available according to ground truth labels. The soft target is computed in step 512 using the ROT information from step 510 and the network outputs. In step 514, the signal error is computed based on the network outputs and the estimated soft target. Finally, an adaptive learning rate algorithm is used to update the weights and biases of the network in step 516. The adaptive learning process (step 516) is configured to increase the training convergence rate by defining one or more methods updating the weights and biases of the network.

Referring to step 512, the process estimates the soft target according to the ROT and the network's output. In one embodiment, a goal is to cause the network to predict the correct class at least one time at any frame during the ROT (ROT frames include $n_r$<frame index<$n_{r+N-1}$) and set the other frames of the ROT as the blank label. In one example (e.g., as illustrated in FIG. 1), "door-knocking" is the target class in the ROT and it is assumed to be the k-th node of the output layer. In this example, the ROT length of N and k-th node of the output layer should be close to one at least one frame during the ROT.

The signal error is computed to train the neural network in step 514. An adaptive rate algorithm is then applied to update the weights and biases of the neural network using the signal error (step 516). In one embodiment, to compute the signal error two cost functions are used: (i) a cross-entropy cost function for non-ROT frames; and (ii) the proposed many-or-one-detection (MOOD) cost function for ROT frames, which is designed to cause the network to spike one or many times during the event duration.

The MOOD cost function may be based on the complement rule, which defines a rule for "not" events. This complement rule is given below:

Probability("not" an event)=1−Probability(event)

The complement rule may be used to classify events in cases where it is difficult to compute the probability of an event, but it is relatively easy to compute the probability of "not" the event. For example, consider a computation of the probability of tossing at least one "head" in 10 tosses of a coin. It may be easier to first compute the probability of "not at least one head" or "no heads," and then apply the complement rule to find the probability of the event of interest as follows:

Probability(at least one head)=1−Probability(no heads)

The output of the network for each node using the sigmoid nonlinear function at the output layer is given below ($z_n^{(m)}$ is the logit value at node m):
Sigmoid output layer:

$$y_n^{(m)} = \frac{1}{1-e^{z_n^{(m)}}}, m = 1, \ldots, M$$

where $y_n^{(m)}$ is the output of neural network at frame n for m-th class.
The MOOD cost function for frames in ROT for k-th output node is defined as $$\text{Loss}_{MOOD}^{(k)} = -\log(1-P_{Not}^{(k)})$$

$$P_{Not}^{(k)} = (1-y_r^{(k)}) \times \ldots \times (1-y_{r+N-1}^{(k)})$$

The signal error for frames in ROT for k-th output node using the above MOOD cost function is as follows:

$$\delta_n^{(k)} = t_n^{soft} - y_n^{(k)}$$

$$t_n^{soft} = \frac{y_n^{(k)}}{1-P_{Not}^{(k)}}$$

In practice if the length of ROT is long, the $P_{Not}^{(k)}$ will be small value because of many multiplications of small values. This will force the network to spike with low amplitude. To resolve this issue, the MOOD cost function is modified as follows:

$$\text{Loss}_{MOOD}^{(k)} = -\gamma \log(1-P_{Not}^{(k)})$$

$$P_{Not}^{(k)} = \sqrt[N]{(1-y_r^{(k)}) \times \ldots \times (1-y_{r+N-1}^{(k)})}$$

So the signal error using the modified MOOD cost function is given below:

$$\delta_n^{(k)} = \frac{\gamma}{N}(t_n^{soft} - y_n^{(k)})$$

$$t_n^{soft} = \frac{y_n^{(k)}}{1 - P_{Not}^{(k)}}$$

Where γ is a scaling hyper parameter that can be tuned based on the application. In case γ=N is used, then the modified MOOD signal error will be similar to the MOOD cost function.

For frames in ROT for all output nodes except the k-th node, the cross-entropy cost function will be used. The cost function and the signal error are given below.

$$Loss_{cross\ entropy}^{(m)} = -\log(1 - y_n^{(k)}), m! = k \& m = 1, \ldots, M$$

$$\delta_n^{(k)} = -y_n^{(k)}$$

The total cost function for frames in ROT would be the sum of loss function for all nodes.

$$Loss_{ROT}^{(all)} = \sum_{m=1, m! = k}^{M} Loss_{cross\ entropy}^{(m)} + Loss_{MOOD}^{(k)}$$

For frames in non-ROT for all output nodes, the cross-entropy cost function will be used. The cost function and the signal error are given below.

$$Loss_{cross\ entropy}^{(m)} = -\log(1 - y_n^{(m)}), m = 1, \ldots, M$$

$$\delta_n^{(k)} = -y_n^{(m)}$$

The total cost function for frames in ROT would be the sum of loss function for all nodes.

$$Loss_{non-ROT}^{(all)} = \sum_{m=1}^{M} Loss_{cross\ entropy}^{(m)}$$

For an acoustic event classification application, each frame belongs to one of M classes of acoustic events. Assume $t_n^{(m)}$ is the target value of the network at frame n for m-th output node of the network, then this value is one when frame n belongs to m-th class of acoustic events and it would be zero for all other nodes. For frame-wise training, the cross-entropy cost function may be used for training non-ROT frames and a many-or-one detection cost function may be used ROT frames for the target node, as described herein. In some embodiments, the MOOD cost function for ROT frames is designed to cause the network to spike one or many times during the event duration. The MOOD cost function may be based on the complement rule, which defines a rule for "not" events. The complement rule is used herein to classify acoustic events in cases where it is difficult to compute the probability of the acoustic event, but it is relatively easy to compute the probability of "not" the event.

In order to train the network and update the weights and biases, the signal error is computed for the non-ROT frames and ROT-frames. In various embodiments, frame-wise training may force the neural network to predict the acoustic event in the entire duration of the acoustic event for all frames. It is desirable to train the network to predict an acoustic event after it sees the entire duration of the acoustic event including the transitions, because the acoustic event have similar temporal-spectral characteristic at the initial parts but unique characteristic when considering the entire duration of the acoustic event. As a result, it is often desirable to force the network to predict an acoustic event almost at the end of it.

To compute the update of the weights and biases, the signal errors for the non-ROT and ROT frames as discussed above is computed and then propagated backwards through the unfolded network from the output layer to the input layer. The algorithm to compute the signal error of each frame is based on the Region of Target (ROT). This region may include all the frames corresponding to the target label of that frame plus some additional frames near the two boundaries (on the left and right) sufficient to include the transitions.

The disclosed system is targeted to detect the occurrence of an event which can either be a repetitive event (e.g., a fire alarm or door knock) or non-repetitive event (e.g., glass breaking or door slamming). This system can also be used for speech detection to improve the performance of far-field speech enhancement techniques in high noise conditions. In this application, the system will be used to identify the speech event in a continuous signal to help the speech enhanced methods to effectively reduce the noise while having minimal artifacts during speech. The speech detection model trained using the systems and methods disclosed herein can also help to reduce the false alarms for a keyword spotting solution. To this end the speech detection is either trained separately or as a combined solution to model the trigger keyword and speech altogether. This will help to have a robust solution for keyword spotting to reject the noise especially those that are impulsive and have a structure close to the keyword of the interest.

Figure 6:
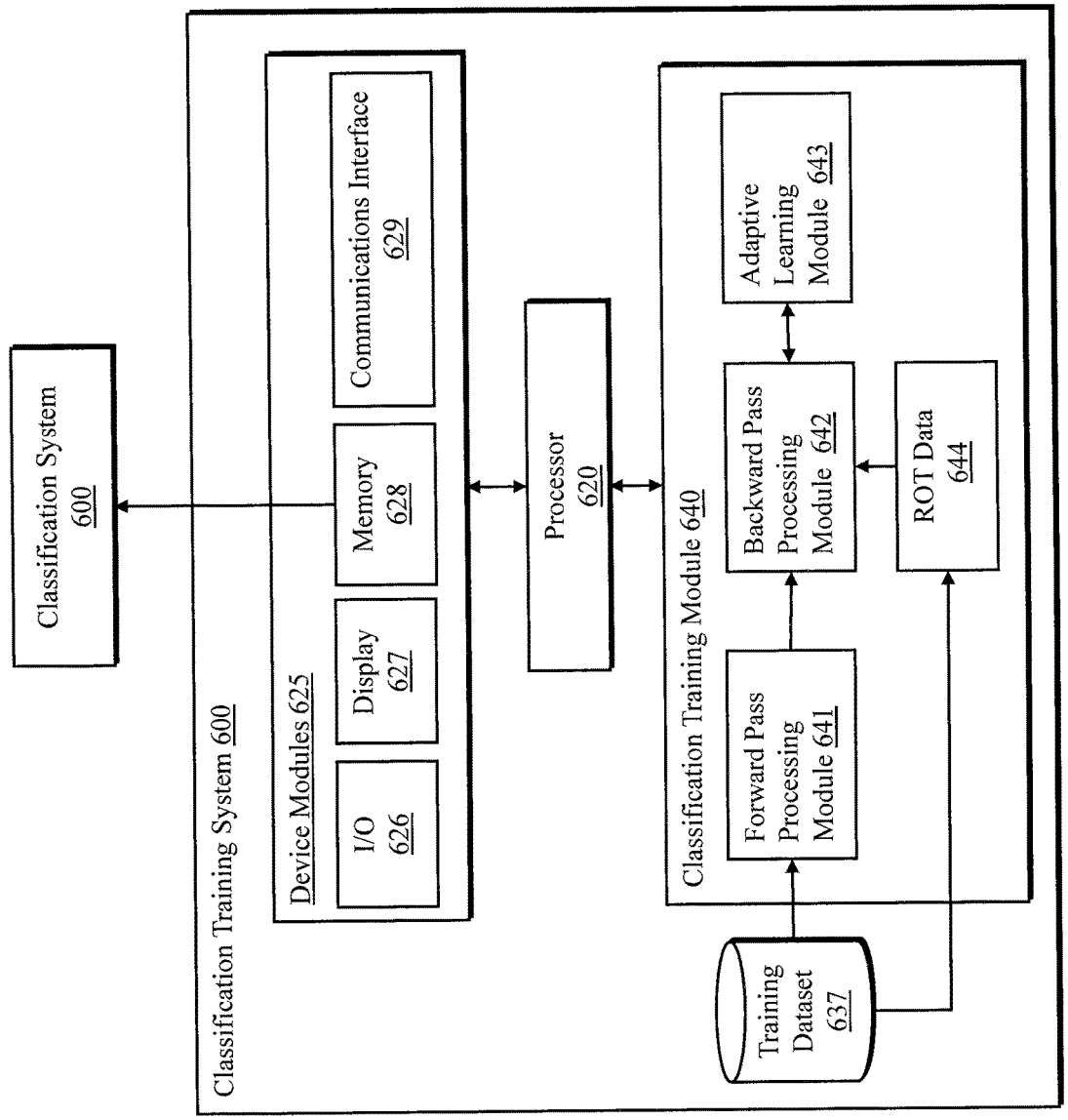
FIG. 6 is a block diagram illustrating an example forward pass process for training a classification system, in accordance with one or more embodiments of the present disclosure.

FIG. 6 illustrates an exemplary classification training system 600 of some embodiments that performs at least part of the start-end point training process described above. The classification training system 600 is programmed to perform the training processes described above and includes the training dataset 637 which contains the pre-segmented labeled training data including keywords with labeled start and end points. Training dataset 637 is connected to a classification training module 640, which includes a ROT module 644. The ROT module 644 (e.g., an ROT table) is built using the information about the segmented training data provided by training dataset 637. The classification training module 640 also includes a forward pass processing module 641 programmed to perform the forward pass process described herein and a backward pass processing module 642 programmed to perform the backward pass processes described herein. In various embodiments, the classification training module 640 may be configured to train a start detector neural network and an end detector neural network for detecting a Region of Target in an input stream, and a multi-class classification system neural network for classifying acoustic events within a detected Region of Target.

The adaptive learning module 643 includes one or more adaptive learning algorithms that can be used by the backward pass processing module to update the weights and biases of a neural network, such as a recurrent neural network. In some of these embodiments, the classification training module 640 can iteratively perform the training processes using different training data to continuously improve and update the neural network. The classification training module 640 can store the updated neural network in the memory 628.

The classification training system 600 may further include a processor 620, which can include central processing unit, a micro-controller, a digital signal processor (DSP), or other processing components, for controlling and facilitating the operations of the classification training system 600, including controlling communications with internal and external devices.

The classification training system 600 further includes one or more communication channels such as a bus for facilitating communication of data between various components of the classification system 600. Components may include device modules 625 for providing device operation and functionality, which may include input/output components 626 such as a touch screen, keyboard, mouse, etc., a display 627 such as a monitor, a memory 628 such as RAM, solid state drive, disk drive, database, etc., and a communications interface 629. In some embodiments, the communications interface 629 may include a network interface (e.g., Ethernet interface) or a wireless transceiver for enabling the classification training system 600 to communicate with remote devices over a network. In operation, the neural network is trained by the classification training system 600 offline and the trained model including the weights and biases of the neural network may be stored in classification system 700 for online classification of audio data.

Figure 7:
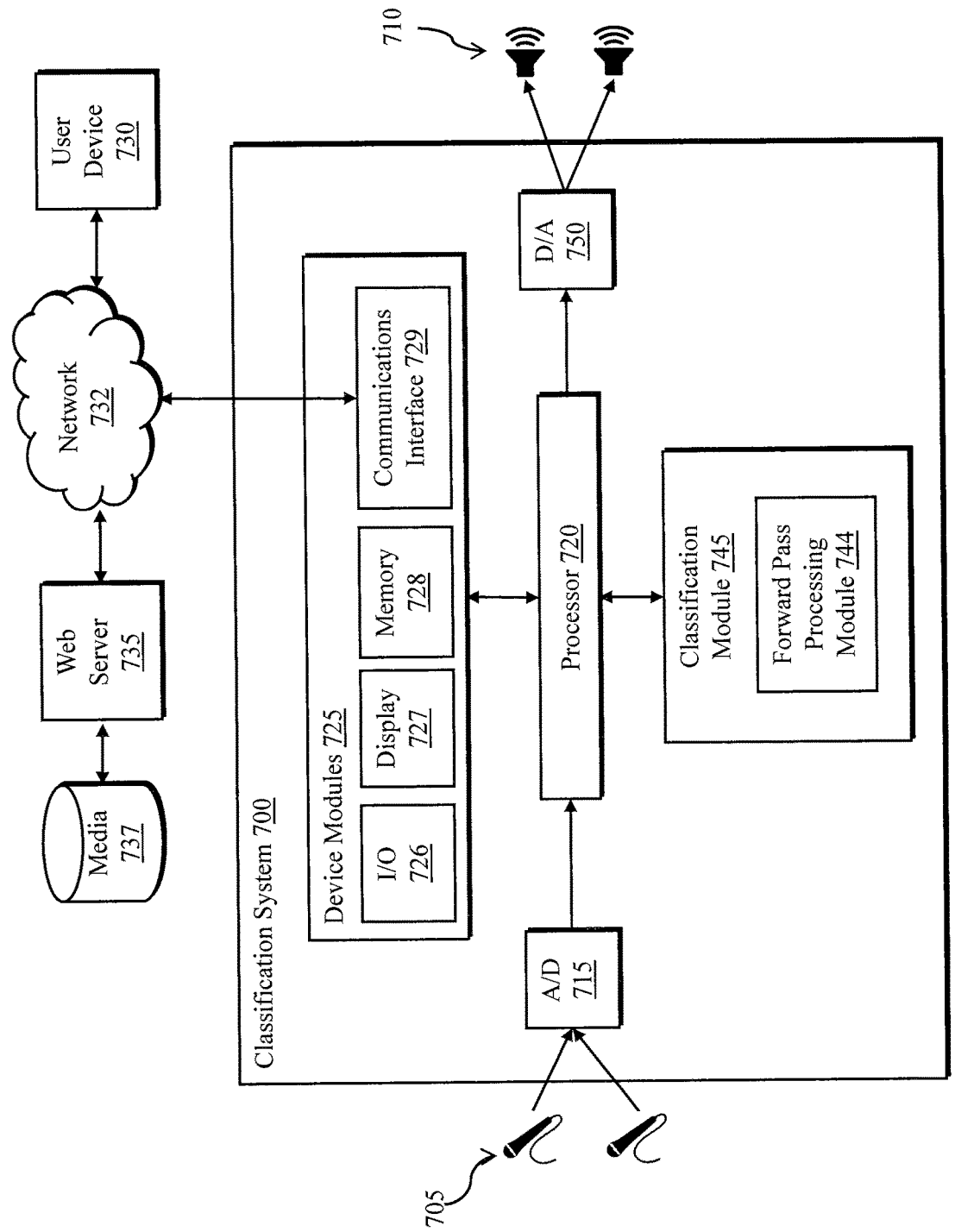
FIG. 7 is a block diagram illustrating an example backward pass process for training a classification system, in accordance with one or more embodiments of the present disclosure.

Referring to FIG. 7, an exemplary classification system 700 of some embodiments is illustrated that performs at least part of the start-end point detection process, described herein. The classification system 700 may be implemented as a mobile device, such as a smart phone or a laptop computer, a television or display monitor, a display computer, a smart speaker, a voice activated assistant, a computer server, an automobile, a speech recognition system, or any other device that provides audio keywords (e.g., commands) recognition capability. The classification system 700 is communicatively coupled with one or more audio inputting devices 705 such as a microphone or microphone array and, optionally, also with one or more audio outputting devices 710 such as a loudspeaker.

In some embodiments, the classification system 700 can include an analog-to-digital converter 715 that converts the analog audio signals received from the audio inputting devices 705 into digital audio signals and sends the digital audio signals to processor 720, which can be a central processing unit, a micro-controller, a digital signal processor (DSP), or other processing components, for controlling and facilitating the operations of the classification system 700, including controlling communications with internal and external devices. The classification system 700 may also include a digital-to-analog converter 750 that converts digital audio signals generated by the different modules and components of the classification system 700 to analog signals before transmitting the analog signals to the one or more audio outputting devices 710.

The classification system 700 includes one or more communication channels such as a bus for facilitating communication of data between various components of the classification system 700. Components may include device modules 725 for providing device operation and functionality, which may include input/output components 726 such as a touch screen, keyboard, mouse, etc., a display 727 such as a monitor, a memory 728 such as RAM, solid state drive, disk drive, database, etc., and a communications interface 729. In some embodiments, the communications interface 729 may include a network interface (e.g., Ethernet interface) or a wireless transceiver for enabling the classification system to communicate with remote devices over a network 732. Remote devices may include user devices 730 (e.g., household appliances, other user electronics, etc.), or a web server 735 that is communicatively coupled with a media storage 737.

The classification system 700 also includes a classification module 745 programmed to implement the trained neural network, which is trained and/or updated by the classification training system 700. The classification module 745 includes a trained forward pass processing module 744 for classifying audio input. In one embodiment, Forward Pass Processing Module 744 is programmed to perform classification and prediction on audio input data received from audio inputting devices 705. In various embodiments, the classification module 745 may include other classification and analysis components, including parts of an automatic speech recognition module such as language processing providing voice command processing, an image search and classification system, an object detection system, or other application configured for use with the trained neural network as described herein.

The forward pass processing module 744 can generate a response in real-time or close to real-time of the audio input data. In some embodiments, the classification module 745 can be programmed to output the response as an audio sound via the digital-to-analog converter 750 and the audio outputting devices 710. Instead of, or in addition to, producing an audio signal, the classification module 745 can be programmed to send a signal to an external device (e.g., to initiate an action or a transaction through the external device) based on the generated response. For example, the classification system 700 can be part of or communicatively coupled with a smart home system, and send a signal to a user device (e.g., a household appliance) via a network 732 (e.g., a local area network within the user's residence) based on the generated response (e.g., sending a signal to turn on the television based on the response generated by an audio input from the user). In another example, the classification system 700 can initiate a transaction with a web server 735 over the Internet based on the generated response (e.g., sending a signal to the web server 735 to purchase a movie stored in media storage 737 based on the response generated by an audio input from the user). The classification system disclosed herein is not limited to processing audio signals but can be used to train a neural network to process different input (e.g., image data, video data, etc.) as well.

In various embodiments, the forward pass processing module 744 comprises a plurality trained neural networks that may include a start detector neural network and an end detector neural network for detecting a Region of Target in an input stream, and a multi-class classification system neural network for classifying acoustic events within a detected Region of Target.

In various embodiments, the classification system of FIG. 7 is configured to provide classifications of individual sound events relating to an audio context or scene. The classification module 745, may be trained to generate a multi-class description of an audio signal which may be received in real time from an audio input device (e.g., microphone 705) and/or an audio file or other audio data stored on a device. For example, the classification system may be used to tag videos including audio based on an associated audio signal. The classification may provide different event classifications such as a classification of audio content from a holiday recording that includes sound events indicating a location (e.g., "beach" context), other people (e.g., "children"), weather events (e.g., rain, thunder), pets (e.g., a dog barking). In some embodiments, a first level of classification may include direct classification of an acoustic event, and context classification may be determined from the classified acoustic events.

These solutions described herein may be directly used for automatic speech recognition (ASR) to detect the phoneme or words. The disclosed system will provide a better solution to detect speech units since it will cause the network to identify the unit of speech in a ROT. This will allow the network to spike at least one time during the ROT rather than causing it to spike all the time. Similarly, the proposed solution may be used for natural language processing to learn the context of a word.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in faun and detail without departing from the scope of the present disclosure. Thus, the present disclosure is limited only by the claims.

What is claimed is:

1. A method for training a neural network for acoustic event classification comprising:
   receiving a stream of training data including a plurality of input samples having segmented labeled data;
   computing a network output for each input sample in a forward pass through the training data; and
   updating weights and biases through a backward pass through the neural network, including determining whether an input frame is in a Region of Target (ROT), estimating the update of the weights and the biases of the neural network based on a cross-entropy cost function for non-ROT frames and a many-or-one detection (MOOD) cost function for ROT frames;
   wherein the network is trained using the MOOD cost function to cause the neural network to spike at least one time during a duration of the acoustic event.

2. The method of claim 1, wherein the neural network is trained for phenome recognition using a multi-class classification.

3. The method of claim 2, wherein updating weights and biases through the backward pass through the neural network further comprises computing a signal error for all output nodes using the cross-entropy cost function for non-ROT regions.

4. The method of claim 2, further comprising computing a soft target for all the frames of the ROT.

5. The method of claim 1, further comprising finding ROT information, including a beginning and length of the ROT.

6. The method of claim 1, wherein adaptively learning to improve a convergence rate comprises determining a momentum for the weights and biases of an output layer, and computing root mean square of gradients for weights and biases not in the output layer.

7. The method of claim 1, wherein the neural network is trained for acoustic event detection, and wherein the neural network is trained to generate a spike when the acoustic event is detected.

8. The method of claim 7, further comprising:
   calculating a signal output error for each network output based on the determination of whether the input frame is in the ROT; and
   updating the weights and biases during a backward pass based on the calculated signal output error.

9. The method of claim 8, wherein updating the weights and biases during the backward pass further comprises applying a cross-entropy cost function if the input frame is not in the ROT.

10. The method of claim 9, wherein calculating the signal output error for each output comprises:
    obtaining ROT information for the input frame, including a length and beginning of the ROT;
    computing a soft target value using the ROT information; and
    computing the signal output error using the computed soft target value and network output value.

11. A classification training system comprising:
    a neural network configured to classify audio input data;
    a training dataset providing segmented labeled audio training examples; and
    a classification training module configured to train the neural network using the segmented labeled training data, the classification training module comprising a forward pass processing module, and a backward pass processing module;
    wherein the forward pass processing module is configured to train the neural network by generating neural network outputs for the training data using a current value of weights and biases for the neural network; and
    wherein the backward pass processing module is configured to train the neural network by updating the weights and biases by passing backward through generated neural network outputs, determining whether an input frame is in a Region of Target (ROT), applying a many-or-one detection (MOOD) cost function for ROT frames, and adaptively learning to improve a convergence rate of the neural network.

12. The training system of claim 11, wherein the weights and biases are updated by computing a signal error for all output nodes using a cross-entropy cost function for non-ROT regions.

13. The training system of claim 12, wherein the neural network is a recurrent neural network; and wherein the weights and biases are updated by improving the convergence rate of the recurrent neural network using an adaptive learning rate algorithm.

14. The training system of claim 13, further comprising a memory storing an ROT table; and wherein the backward pass module comprises an ROT information module configured to find a beginning and a length of the ROT using a ROT table.

15. The training system of claim 14, wherein the backward pass module comprises a soft target module configured to compute a soft target for all the frames of the ROT.

16. The training system of claim 15, wherein the soft target module is further configured to compute the signal error using the computed soft target value and network output value.

17. The training system of claim 11, wherein the classification training module is configured to train for audio event recognition using a multi-class classification.

18. The training system of claim 11, wherein the classification training module is configured to train for keyword spotting.

19. The training system of claim 11, wherein two cost functions are used to compute a signal error, wherein the two cost functions comprise a cross-entropy cost function for non-ROT frames, and the MOOD cost function for ROT frames.

20. The training system of claim 11, wherein adaptively learning to improve a convergence rate of the neural network comprises determining a momentum for the weights and biases of an output layer and computing a root mean square of gradients for the weights and biases.

* * * * *